(12) United States Patent
Boldyrev et al.

(10) Patent No.: US 9,477,787 B2
(45) Date of Patent: Oct. 25, 2016

(54) METHOD AND APPARATUS FOR INFORMATION CLUSTERING BASED ON PREDICTIVE SOCIAL GRAPHS

(75) Inventors: Sergey Boldyrev, Söderkulla (FI); Pavandeep Kalra, Shrewsbury, MA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/221,452

(22) Filed: Aug. 30, 2011

(65) Prior Publication Data

US 2013/0054604 A1 Feb. 28, 2013

(51) Int. Cl.
*G06F 17/30* (2006.01)
*G06F 7/00* (2006.01)

(52) U.S. Cl.
CPC ... *G06F 17/30997* (2013.01); *G06F 17/30598* (2013.01)

(58) Field of Classification Search
USPC .................................. 707/737, 738, 740, 739
See application file for complete search history.

(56) References Cited

U.S. PATENT DOCUMENTS

| | | | |
|---|---|---|---|
| 8,214,484 B2 * | 7/2012 | Arora ....................... | G06F 17/10 345/441 |
| 2009/0216773 A1 | 8/2009 | Konopnicki | |
| 2009/0234876 A1 * | 9/2009 | Schigel et al. ................ | 707/102 |
| 2010/0145771 A1 * | 6/2010 | Fligler et al. .................. | 705/10 |
| 2011/0004463 A1 | 1/2011 | Gryc et al. | |
| 2011/0208822 A1 | 8/2011 | Rathod | |
| 2011/0276649 A1 * | 11/2011 | Pujol et al. .................... | 709/208 |
| 2011/0320536 A1 * | 12/2011 | Lobb ....................... | G06Q 50/01 709/205 |
| 2012/0011591 A1 | 1/2012 | Cormode et al. | |

OTHER PUBLICATIONS

Aberer, K., et al. "Emergent semantics principles and issues" (Abstract) 9th International Conference on Database Systems for Advanced Applications (DASFAA 2004).
Ding L., et al. "Tracking RDF Graph Provenance using RDF Molecules" (Abstract) Fourth International Semantic Web Conference, Nov. 2005.
Gupta, R., et al. "Optimized query planning of continuous aggregation queries in dynamic data dissemination networks" (Abstract) Proceedings of the 16th International Conference on World Wide Web, May 8-12, 2007, Banff, Alberta, Canada.
Olston, C., et al. "Adaptive filters for continuous queries over distributed data streams" (Abstract) Proceedings of the 2003 ACM SIGMOD International Conference on Management of Data, Jun. 9-12, 2003.
Thiran, P., et al. "Information processing using stable and unstable oscillations: a tutorial, Cellular Neural Networks and their Applications" (Abstract) pp. 127-136.

(Continued)

*Primary Examiner* — Usmaan Saeed
*Assistant Examiner* — Raquel Perez-Arroyo
(74) *Attorney, Agent, or Firm* — Alston & Bird LLP

(57) ABSTRACT

An approach is provided for providing information clustering based on predictive social graphs. An information clustering platform processes and/or facilitates a processing of one or more social graphs associated with one or more users to cause, at least in part, a prediction of one or more future states of the one or more social graphs. The information clustering platform further causes, at least in part, a clustering of one or more data items associated with at least one information space based, at least in part, on the one or more social graphs, the one or more future states, or a combination thereof.

20 Claims, 13 Drawing Sheets

(56) References Cited

OTHER PUBLICATIONS

Zhang, K., et al. "Query planning for the grid: adapting to dynamic resource availability" (Abstract) Fifth IEEE International Symposium on Cluster Computing and the Grid (CCGrid'05)—vol. 2, p. 751-758, May 9-12, 2005.

Andreyev Yu. V., et al., "Information Processing in Nonlinear Systems with Dynamic Chaos", International Seminar Nonlinear Circuits and Systems Proceedings, vol. 1, Jun. 16-18, 1992, Russia.

Jose Luis Ambite, et al., "ARIADNE: A System for Constructing Mediators for Internet Sources", Information Sciences Institute, Integrated Media Systems Center and Department of Computer Science, University of South California, http://www.isi.edu/ariadne.

International Search Report for related International Patent Application No. PCT/FI2012/050761 dated Dec. 18, 2012, pp. 1-6.

Kabiljo, "Social Graph Clustering", e-RAF Journal on Computing, vol. 3 (2011): http://joc.raf.edu.rs/3/34_k0010.pdf.

Liben-Nowell et al., "The Link Prediction Problem for Social Networks", Jan. 8, 2004: http://www.cs.cornell.edu/home/kleinber/ink-pred.pdf.

Written Report for related International Patent Application No. PCT/FI2012/050761 dated Dec. 18, 2012, pp. 1-10.

E. Novak et al., "A Survey of Security and Privacy in Online Social Networks", Department of Computer Science, The College of William and Mary, pp. 1-32.

M. Roth et al., "Suggesting Friends Using the Implicit Social Graph", Google Inc., pp. 1-9.

* cited by examiner

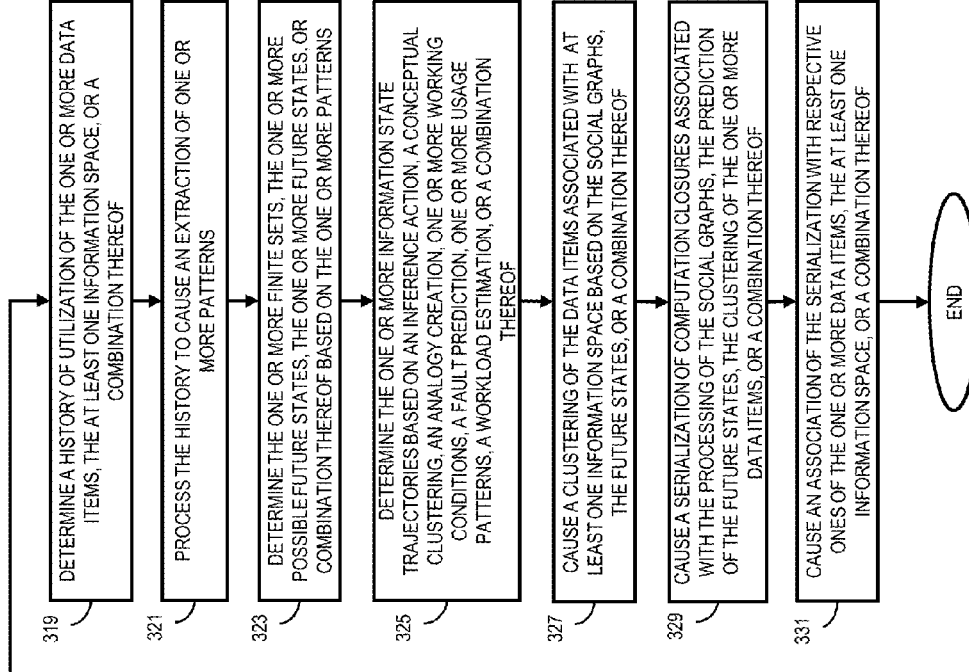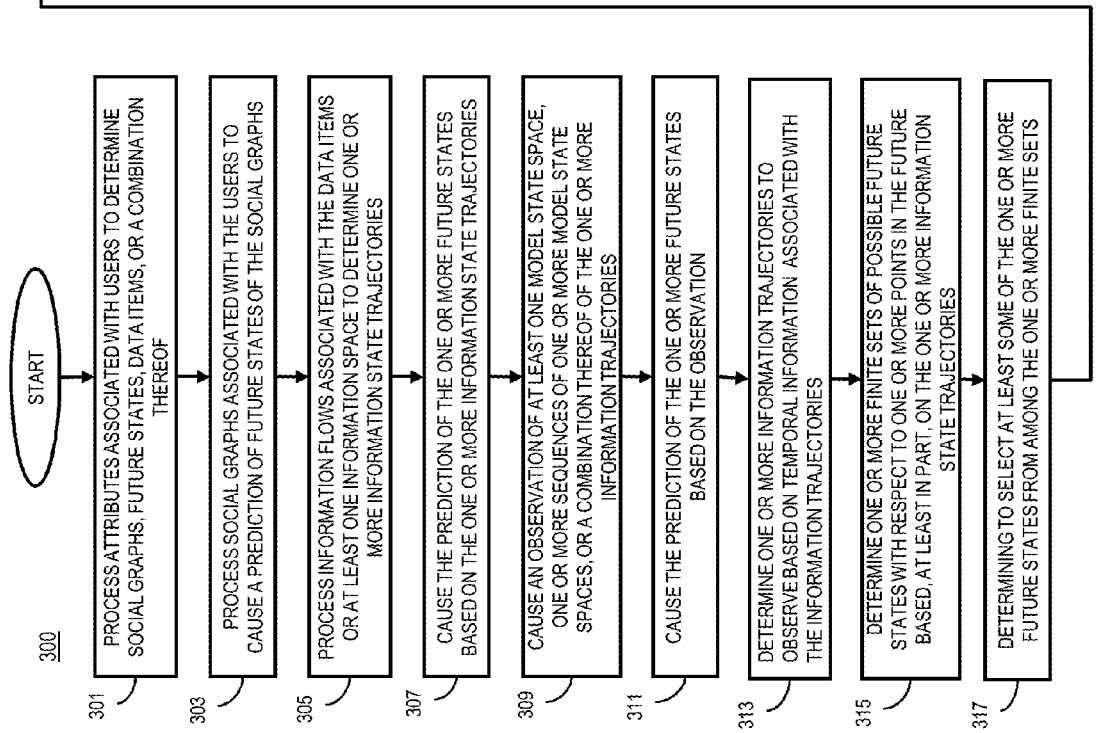
FIG. 3

METHOD AND APPARATUS FOR INFORMATION CLUSTERING BASED ON PREDICTIVE SOCIAL GRAPHS

BACKGROUND

Service providers (e.g., wireless, cellular, etc.) and device manufacturers are continually challenged to deliver value and convenience to consumers by, for example, providing compelling network services. These services are leading to vast amounts of data (structured and binary) which need to be managed, stored, searched, analyzed, etc. Over the last decade, the internet services have accumulated data in the range of exabytes ($10^{16}$ bytes). Although most of this data is not structured in nature, however, it must be stored, searched and analyzed appropriately before any real time information can be drawn from it for providing services to the users.

Social networking services provide various interactions among communities of users (e.g., family, friends, colleagues, classmates, etc.) Social based services drive a lot of data into the network system. For example, the network system providing social networking services needs to capture every comment and post by a friend or by any other user connected to the user via the social network. This leads to petabytes ($10^{15}$ bytes) of data even for a social network with only a few million users. Most of the search engines, such as for example Lucene® are geared to search on certain small amounts of data. However, when encountered with massive amounts of data, search engines such as Lucene do not scale.

In order to provide a scalable search indexing based infrastructure, data partitioning strategies are used. Examples of common partitioning strategies used by industries include key based partitioning, location based partitioning, etc. The location based partitioning is based on the fact that user location can be easily determined and can be used to find related content that has been pre-partitioned based on location. However, location based partitioning is not an efficient strategy in social networking systems. In order to scale in such systems, social graph based partitioning is a highly efficient mechanism. In social graph based partitioning, all use cases involving search of family and friends can be associated with data spaces which are closely aligned with the social graph of an individual. Furthermore, a predictive social graph provides data clustering methods to cluster data associated with the users of a social network according to their existing and possible future affiliations, interests, etc.

SOME EXAMPLE EMBODIMENTS

Therefore, there is a need for an approach for providing information clustering based on predictive social graphs.

According to one embodiment, a method comprises processing and/or facilitating a processing of one or more social graphs associated with one or more users to cause, at least in part, a prediction of one or more future states of the one or more social graphs. The method also comprises causing, at least in part, a clustering of one or more data items associated with at least one information space based, at least in part, on the one or more social graphs, the one or more future states, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more social graphs associated with one or more users to cause, at least in part, a prediction of one or more future states of the one or more social graphs. The apparatus is also caused to cause, at least in part, a clustering of one or more data items associated with at least one information space based, at least in part, on the one or more social graphs, the one or more future states, or a combination thereof.

According to another embodiment, a computer-readable storage medium carries one or more sequences of one or more instructions which, when executed by one or more processors, cause, at least in part, an apparatus to process and/or facilitate a processing of one or more social graphs associated with one or more users to cause, at least in part, a prediction of one or more future states of the one or more social graphs. The apparatus is also caused to cause, at least in part, a clustering of one or more data items associated with at least one information space based, at least in part, on the one or more social graphs, the one or more future states, or a combination thereof.

According to another embodiment, an apparatus comprises means for processing and/or facilitating a processing of one or more social graphs associated with one or more users to cause, at least in part, a prediction of one or more future states of the one or more social graphs. The apparatus also comprises means for causing, at least in part, a clustering of one or more data items associated with at least one information space based, at least in part, on the one or more social graphs, the one or more future states, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method disclosed herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a flowchart of a process for providing information clustering based on predictive social graphs, according to one embodiment;

DESCRIPTION OF SOME EMBODIMENTS

Figure 1:
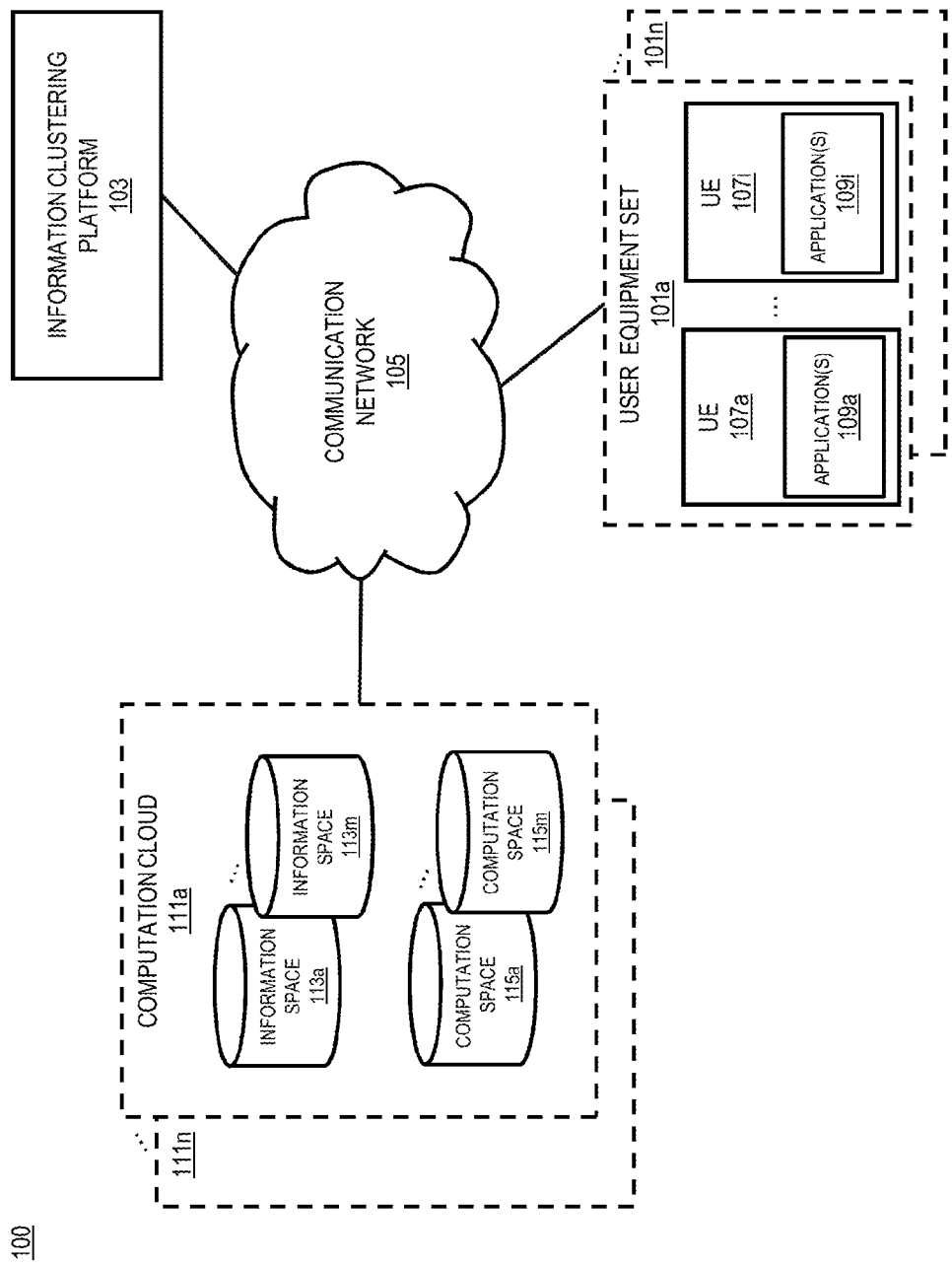
FIG. 1 is a diagram of a system capable of providing information clustering based on predictive social graphs, according to one embodiment.

Examples of a method, apparatus, and computer program for providing information clustering based on predictive social graphs are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "computation closure" identifies a particular computation procedure together with relations and communications among various processes including passing arguments, sharing process results, selecting results provided from computation of alternative inputs, flow of data and process results, etc. The computation closures (e.g., a granular reflective set of instructions, data, and/or related execution context or state) provide the capability of slicing of computations for processes and transmitting the computation slices between devices, infrastructures and information sources.

As used herein, the term "cloud" refers to an aggregated set of information and computation closures from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats. Although various embodiments are described with respect to clouds, it is contemplated that the approach described herein may be used with other structures and conceptual description methods used to create distributed models of information and computations.

In one embodiment, according to a definition by the National Institute of Standards and Technology (NIST), cloud computing is a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is composed of five essential characteristics, three service models, and four deployment models. The essential characteristics of the cloud model consist of on-demand self-service, broad network access, resource pooling, rapid elasticity, and measured Service.

The on-demand self-service characteristic of the cloud model enables a consumer to unilaterally provision computing capabilities, such as server time and network storage, as needed automatically without requiring human interaction with each service's provider.

The broad network access characteristic of the cloud model provides capabilities available over the network that can be accessed through standard mechanisms that promote use by heterogeneous thin or thick client platforms (e.g., mobile phones, laptops, and PDAs).

Based on the resource pooling characteristic of the cloud model, the provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

The rapid elasticity of the cloud model provides rapid and elastic, and in some cases automatic, provision of capabilities to quickly scale out and rapid release to quickly scale in. To the consumer, the capabilities available for provisioning often appear to be unlimited and can be purchased in any quantity at any time.

According to the measured service characteristic, cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Furthermore, the service models associated with the cloud model include Cloud Software as a Service (SaaS), Cloud Platform as a Service (PaaS), and Cloud Infrastructure as a Service (IaaS).

The Cloud Software as a Service (SaaS) provides, to the customer, the capability to use the provider's applications running on a cloud infrastructure. The applications are accessible from various client devices through a thin client interface such as a web browser (e.g., web-based email). According to this service model, the consumer does not manage or control the underlying cloud infrastructure including network, servers, operating systems, storage, or even individual application capabilities, with the possible exception of limited user-specific application configuration settings.

The Cloud Platform as a Service (PaaS) provides, to the customer, the capability to deploy onto the cloud infrastructure consumer-created or acquired applications created using programming languages and tools supported by the provider. According to this service model, the consumer does not manage or control the underlying cloud infrastructure including network, servers, operating systems, or storage, but has control over the deployed applications and possibly application hosting environment configurations.

The Cloud Infrastructure as a Service (IaaS) provides, to the customer, the capability to provision processing, storage, networks, and other fundamental computing resources where the consumer is able to deploy and run arbitrary software, which can include operating systems and applications. According to this service model, the consumer does not manage or control the underlying cloud infrastructure but has control over operating systems, storage, deployed applications, and possibly limited control of select networking components (e.g., host firewalls).

Additionally, a cloud model can be deployed as a private cloud, a community cloud, a public cloud, or a hybrid cloud. In one embodiment, according to a private cloud model, the cloud infrastructure is operated solely for an organization. It may be managed by the organization or a third party and may exist on premise or off premise. Alternatively, a community cloud infrastructure is shared by several organizations and supports a specific community that has shared concerns (e.g., mission, security requirements, policy, and compliance considerations). It may be managed by the organizations or a third party and may exist on premise or off premise. A public cloud infrastructure is made available to the general public or a large industry group and is owned by an organization selling cloud services. Finally, a hybrid cloud infrastructure is a composition of two or more clouds (private, community, or public) that remain unique entities but are bound together by standardized or proprietary technology that enables data and application portability (e.g., cloud bursting for load-balancing between clouds).

FIG. 1 is a diagram of a system capable of providing information clustering based on predictive social graphs, according to one embodiment. As the volume of data and information available to the users of UEs $107a$-$107i$ via the network 105 increases, there is more need for efficient search methods for providing real time answers to various user queries and data requests. Typically, the database management systems include various indexing and partitioning technologies in the interests of improving performance. It is noted that the currently used data indexing infrastructures based on partitioning methods, are mostly proprietary solutions developed and owned by manufacturers, service providers, etc. However these known indexing solutions basically use either key based or location based data partitioning and clustering strategies.

In one embodiment, when encountered with massive amounts of data associated with social networks, in order to provide a scalable search indexing based infrastructure, some data partitioning strategies need to be implemented to scale when trying to forecast social graphs, wherein a social graph is described as the global mapping of everybody and how they are related.

In one embodiment, the social graphs of users of UEs $107a$-$107i$ may be maintained and processed by the computation clouds $111a$-$111n$. For example, the graph data may be stored in information spaces $113a$-$113m$ while the program codes, scripts, or software that process and maintain the social graphs may be provided by the computation spaces $115a$-$115m$.

The current data partitioning strategies explored by industries are based on using easy to find attributes of the data. However, in cases when a huge amount of data needs to be partitioned, these common strategies do not scale very efficiently in a social networking space.

In one embodiment, in order to scale in such social networking systems, social graph based data partitioning is a highly efficient mechanism. A data partitioning strategy based on social graph clustering is an efficient way of storage of large amounts of data where the use cases involve social interaction.

In one embodiment, the data associated with a user of UEs $107a$-$107i$ of a social network is stored in information spaces $113a$-$113m$ based on the social graph of the user. In this embodiment, because of the efficiency of the partitioning strategy based on social graph clustering for storage of large amounts of data, the search will be much more efficient. However, at the time when data associated with a user of UEs $107a$-$107i$ of the social network is stored in the network, the social graph of that user may not be yet available (e.g. have not been created yet).

To address this problem, a system 100 of FIG. 1 introduces the capability to providing information clustering based on predictive social graphs. In one embodiment, the information clustering platform 103 treats the social network information management process as a regular periodic motion of a dynamic information flow of a certain number of information trajectories. For example, an information trajectory, similar to a motion trajectory, provides a mapping of information flow through information spaces $113a$-$113m$.

In one embodiment, the information clustering platform 103 interprets the state of information prediction process corresponding with creation of information trajectories as a state of a dynamic process in terms of regular and stochastic motion. At any moment, the information clustering platform 103 may predict the state of whole information management process only by observing the model state space corresponding with the process.

In one embodiment, the information clustering platform 103 determines the predictive social graph of a user of UEs 107a-107i based, at least in part, on some key user attributes (for example, user affiliations, interests, age, education, location, etc.). These attributes can be used by the information clustering platform 103 to forecast the social graph of each user.

In one embodiment, the information clustering platform 103 predicts the social graph of a user of UEs 107a-107i and pools the user with possible users of other UEs 107a-107i who are likely to be in the circle of work, colleagues, friends, etc. It is noted that the predicted social graph may not be completely accurate, but a likely social graph can be good enough to cluster the users of UEs 107a-107i into groups of likely users who may need to interact with each other.

In one embodiment, a user of UE 107a may need the information regarding "the most common activity my friends are currently doing". An answer to this query may require search across all the friends of the user, while the friends' information may be distributed in the clouds 111a-111n or in any other storage throughout the communication network 105 in random partitions.

In another embodiment, a user of UE 107b may need the information regarding "what are my friends from high school doing for the spring break". Similarly, this query may require searching across friend activities which may be distributed on distributed storages in random partitions.

Typically, searching on the data space across all user spaces is not efficient. However, predictive social graph clustering enables high performance storage and search for social networking use cases.

As shown in FIG. 1, the system 100 comprises a user equipment (UE) sets 101a-101n of UEs 107a-107i having connectivity to the information clustering platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 107a-107i can support any type of interface to the user (such as "wearable" circuitry, etc.).

In one embodiment, the structure of the social network information management process by the information clustering platform 103 is considered as a type of stochastic self-organization, wherein a future state of the process is determined based, at least in part, on predictable actions.

In one embodiment, the social network information is presented by the information clustering platform 103 as a regular periodic motion of a dynamic information flow of a certain number of information trajectories. Thus, the corresponding information prediction process state is interpreted as a state of a dynamic process in terms of regular and stochastic motion.

In one embodiment, the social network information management process is represented as a particular model that follows a certain type of state trajectory in a multidimensional state space that is sampled by stable and non-stable states. It is noted that the transition between those states, can be initiated by aspects, wherein the aspects represent any possible impact of any external entity that can utilize that particular information management process. Therefore, at any moment in time, it is possible to predict the state of a whole information management process only by observing its corresponding model state space. In particular, several known methods such as for example "slicing" can be used for providing the model state space.

In one embodiment, from the information management point of view, all consumptions and/or allocations that would be necessary to undertake to translate the information closures into any potential demanded form or recombine some new form for the current needs would be seamlessly provided as a native feature of such information management process.

In one embodiment, the information management process states may be determined based, at least in part, on inference actions showing the actions leading to inference of the data, conceptual clustering not only based on the inherent structure of the data but also the descriptions available on the data, analogy creation or creating interpretations of data using other related data, working conditions, fault prediction, usage pattern, workload estimation, etc.

In one embodiment, a unified predictive social graph is provided clustering as information management process models that can accommodate different grains of information with different types of relationships. Such information management process can reflect information closures it might handle and, concurrently, such content can reflect information management process it may reside in.

In one embodiment, the overall social graph prediction process consists of observation of the sequences of the most recent state route (trajectory). As previously stated, the trajectory defines a finite set of possible future states at given point in the (nearest) future. This knowledge is leveraged in controlling the system management and determining the optimal working parameters for the system. The set of possible future states can be further reduced by observing the history of the aspects and by trying to extract patterns in their sequences. Predicting the future impacts to the social graph significantly improves the accuracy of the state route (trajectory) prediction.

In one embodiment, the transformation for translating the data content into any potential future form or elaborate some new form for the current needs can be seamlessly provided as a native feature of the prediction mechanism. On the other hand, from the social graph management point of view, a number of social graph information states (e.g. working conditions) can be possible to determine. Such states may be, for example, inconsistence prediction, user attributes forecasting, usage patterns, workload estimation, etc.

In one embodiment, all of the transitive that represent social graph information stream are correlated, meaning that orthogonal by the moment of the creation, the closures have degree of orthogonality no more than one unit. Therefore, at any moment once the closure generation is dropped, information fragments are easily recombined and aggregated to serve any other query.

In one embodiment, the degree of orthogonality can be driven by the least meaningful information fragment, where the information fragment is defined as RDF molecules, the finest component into which the graph can be decomposed without loss of information, or by signature, or by equivalent class, a set of RDF molecules representing equivalent information.

In one embodiment, a social graph can be characterized by constructing the information gain vector. Furthermore, the aspects can be synthesized by a particular productization mechanism for consolidating the aspects into specific platforms. Subsequently, the information gain can be transformed to signatures, for example, through signatures synthesis. The signature synthesis mechanism can be adjusted to accept overlapping, in order to enable weighing.

In one embodiment, trajectories are constructed for particular signature series. Additionally, trajectory traversing, (e.g. view) can be performed either by slicing (for example through Poisson regression methods, multimodal tracking, etc.) or by emphasizing any particular aspect (e.g., rules, queries etc).

In one embodiment, various features can be provided such as, for example, difference between information based on time domain; search for particular information, since information is processed in signatures domain, the process is instant; various inference actions for the primary information domain, etc. Additionally, updates can be accounted by the trajectory and signatures synthesis process.

In one embodiment, information gain of any data can be constructed by a set of aggregate queries. Therefore, relationships between static and dynamic information entities, as well as the information entities, are defined (inserted/retracted triples, subscriptions and queries). It is noted that a static information is just data source readings, a subscription is the value of any query over the data source reading fixed in a certain time frame, and a query is presented as one vector. Such representation may not be the only one, since any other suitable approach can be used as well.

In one embodiment, the lowest recombination element can be considered as a grain of any information fragment. Generalized information control is represented by relationship between Query/Information product and dispersing, thus, is provided by the accounted signatures.

In one embodiment, the main profile of information control is shaped by the multitude of instances of the previously mentioned process. Since exact solution is characterized by means of limit cycle shaped in the phase space when the phase volume passes the break point of phase volume reduction, it is a matter of the aspects nature to direct and conduct the phase trajectory of the whole process.

It is noted that any, even potential, candidate of information fragment is recognized as one element of the particular phase trajectory, e.g. point. It encapsulates any potential candidate from any other information fragment converging the uncertainty of the status of any information fragment in the whole system to the relationship between stable/unstable trajectory motion and aspects featured as the drivers of the recombination process.

By way of example, the UEs 107a-107i, and the information clustering platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
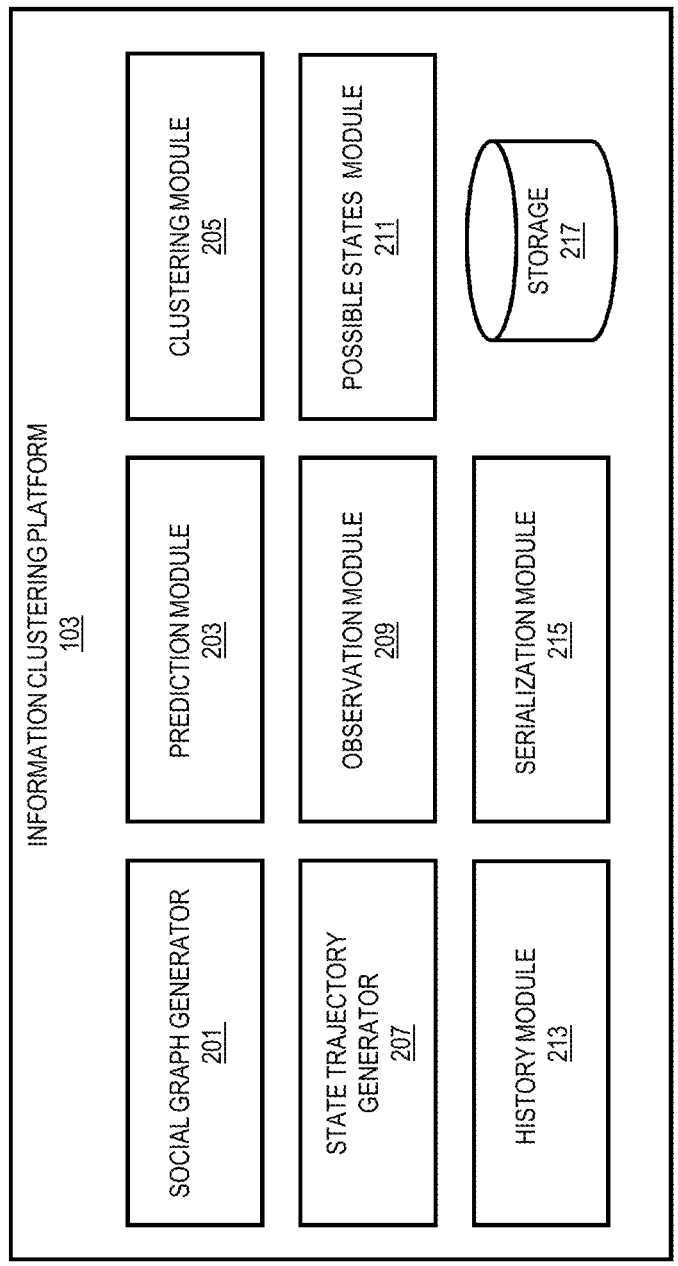
FIG. 2 is a diagram of the components of an information clustering platform, according to one embodiment.

FIG. 2 is a diagram of the components of the information clustering platform, according to one embodiment. By way of example, the information clustering platform includes one or more components for providing information clustering based on predictive social graphs. It is contemplated that the functions of these components may be combined in one or more components or performed by other components of equivalent functionality. In this embodiment, the information clustering platform 103 includes a social graph generator 201, a prediction module 203, a clustering module 205, a state trajectory generator 207, an observation module 209, a possible states module 211, a history module 213, a serialization module 215 and a storage 217.

Figure 4A:
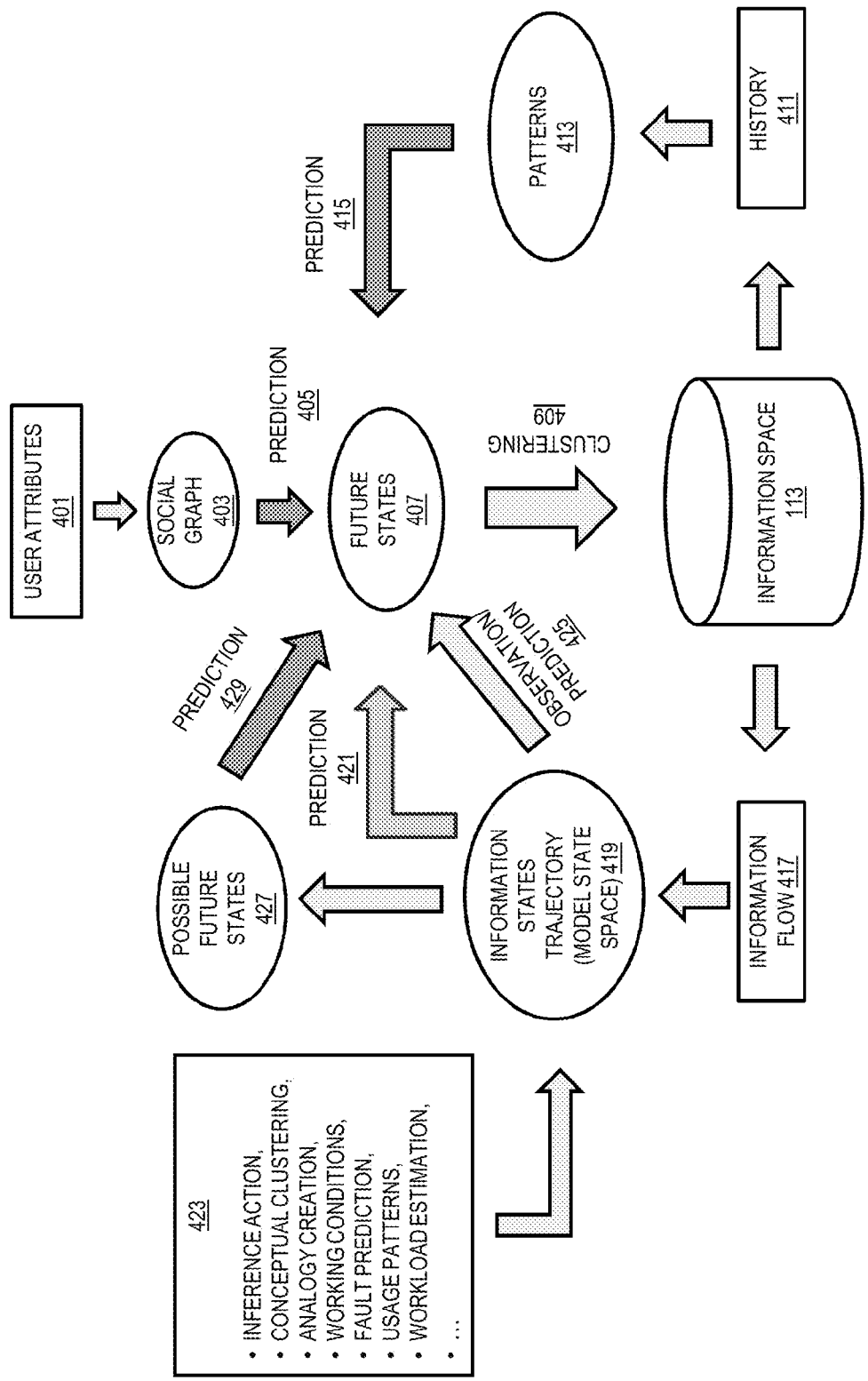
FIG. 4A is a flow diagrams of the process of FIG. 3 for providing information clustering based on predictive social graphs, according to one embodiment.
Figure 9:
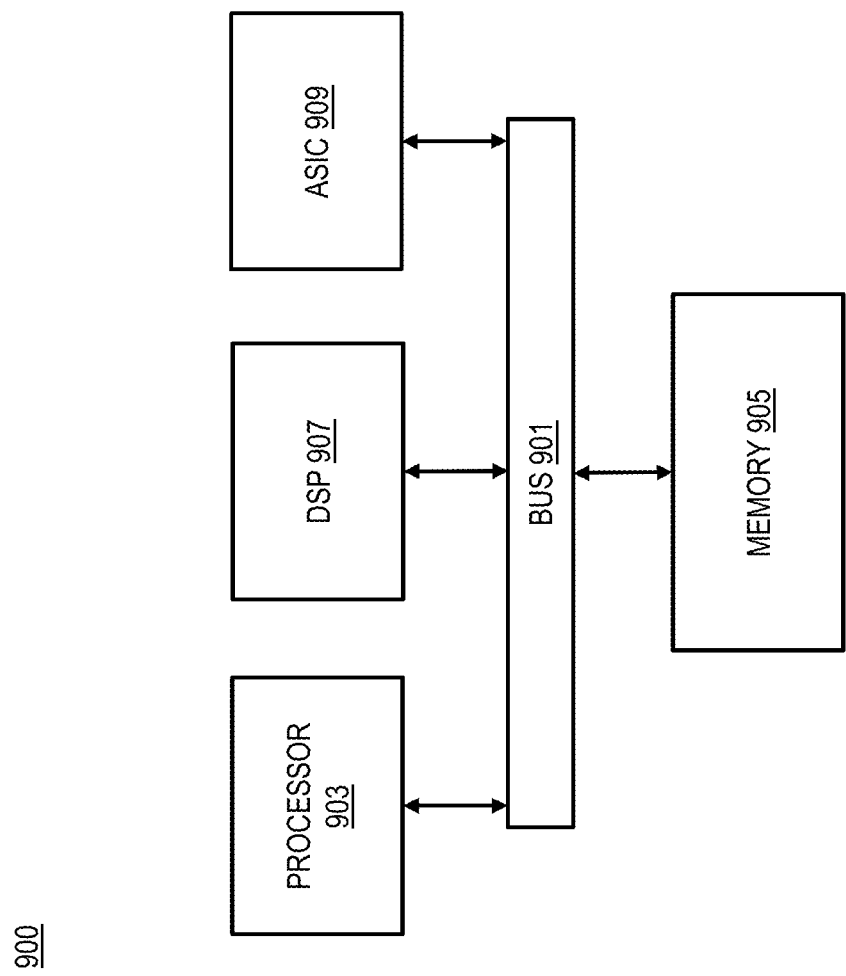
FIG. 9 is a diagram of a chip set that can be used to implement an embodiment of the invention.

FIG. 2 is described with reference to FIGS. 3 and 4A, wherein FIG. 3 shows a flowchart 300 of a process for providing information clustering based on predictive social graphs, according to one embodiment and FIG. 4A shows a flow diagram of the process. In one embodiment, the information clustering platform 103 performs the process 300 and is implemented in, for instance, a chip set including a processor and a memory as shown in FIG. 9.

In one embodiment, per step 301, of process 300 of FIG. 3, the social graph generator 201 processes and/or facilitates a processing of one or more user attributes 403 associated with one or more users of UEs 107a-107i to determine one or more social graphs 403. The social graph generator 201 may also determine one or more future states 405, one or more data items in information space 113, or a combination thereof.

In one embodiment, per step 303 of FIG. 3, the prediction module 203 processes and/or facilitates a processing of one or more social graphs 403 associated with one or more users to cause, at least in part, a prediction (shown as array 405 in FIG. 4A) of one or more future states 407 of the one or more social graphs 403.

In one embodiment, the one or more data items, the at least one information space 113, or a combination thereof comprise one or more information flows 417. Per step 305 of FIG. 3, the state trajectory generator 207 processes and/or facilitates a processing of the one or more information flows 417 to determine one or more information state trajectories 419.

In one embodiment, per step 307 of FIG. 3, the prediction module 203 causes, at least in part, prediction of the one or more future states 407 (shown by arrow 421) based, at least in part, on the one or more information state trajectories 419.

In one embodiment, the one or more information state trajectories 419 may include, at least in part, one or more regular motions (e.g., regular periodic motion of a dynamic information flow of a certain number of information trajectories), one or more stochastic motions (wherein a future state of the process is determined based, at least in part, on predictable actions), or a combination thereof.

In one embodiment, per step 309 of FIG. 3, the observation module 209 causes, at least in part, an observation of at least one model state space, one or more sequences of one or more model state spaces, or a combination thereof of the one or more information trajectories.

In one embodiment, per step 311 of FIG. 3 the prediction module 203 causes, at least in part, the prediction of the one or more future states 407 based, at least in part, on the observation (shown by arrow 425 of FIG. 4A).

In one embodiment, per step 313 of FIG. 3, the observation module 209 determines one or more information trajectories 419 to observe. The determination may be performed based, at least in part, on temporal information associated with the one or more information trajectories 419. In one embodiment, the overall social graph prediction process by the information clustering platform 103 constitutes of the sequence observation of the most recent state trajectory by the observation module 209. As previously stated, the trajectory defines a finite set of possible future states at given point in the (nearest) future. This knowledge is then leveraged in controlling the process management and determining the optimal working parameters, including information fragments, for the process.

In one embodiment, per step 315 of FIG. 3, the possible states module 211 determines one or more finite sets of possible future states 427 with respect to one or more points in the future based, at least in part, on the one or more information state trajectories 419. In one embodiment, per step 317 of FIG. 3, the prediction module 203 determines to select at least some of the one or more future states from among the one or more finite sets 427 for predicting the future states 407 (shown by arrow 429).

In one embodiment, per step 319 of FIG. 3, the history module 213 determines a history 411 of utilization of the one or more data items, the at least one information space 113, or a combination thereof. In one embodiment, per step 321 of FIG. 3, the history module 213 processes and/or facilitates a processing of the history 411 to cause, at least in part, an extraction of one or more patterns 413.

In one embodiment, per step 323 of FIG. 3, the prediction module 203 determines the one or more future states 407 based, at least in part, on the one or more patterns (shown by arrow 415)

In one embodiment, the set of possible future states 427 can be further reduced by observing the history 411 of the aspects and by extracting the patterns 413 in their sequences. Predicting the future impacts (information consumers and providers) to the system significantly improves the accuracy of the state trajectory prediction, and therefore, improves overall utilization of any fragments of information in the information space 113.

In other embodiments, the possible states module 211 may also use the patterns 413 for determining the finite sets, the one or more possible future states, or combination thereof.

In one embodiment, per step 325 of FIG. 3, the state trajectory generator 207 determines the one or more information state trajectories 419 based, at least in part, on various determination factors 423 such as an inference action, a conceptual clustering, an analogy creation, one or more working conditions, a fault prediction, one or more usage patterns, a workload estimation, or a combination thereof.

The inference action is related to actions leading to inference of the data. The state trajectory generator 207 can use the inference actions to determine how each action can provide a future state from a current state. The conceptual clustering consists of clustering the data not only based on the inherent structure of the data but also the descriptions available on the data, such as for example, data associated with an event, news, location, etc. The state trajectory generator 207 can use the conceptual clustering to determine information state trajectories based on commonality or differences among conceptual clusters the data is part of. The analogy creation includes creating interpretations of data using other related data. The working conditions, fault prediction, usage pattern, and workload estimation are other determination factors, associating extra metadata to the data items of the information space 113, in order to be able to analyze and categorize the data in a more efficient way and provide trajectories with higher accuracy.

In one embodiment, per step 327 of FIG. 3, the clustering module 205 causes, at least in part, a clustering of one or more data items associated with at least one information space 113 based, at least in part, on the one or more social graphs 403, the one or more future states 407, or a combination thereof (shown by arrow 409).

In one embodiment, per step 329 of FIG. 3, the serialization module 215 causes, at least in part, a serialization of one or more computation closures from the computation space 115a-115m associated with the processing of the one or more social graphs 403, the prediction of the one or more future states 407, the clustering 409 of the one or more data items 113, or a combination thereof.

In one embodiment, per step 331 of FIG. 3, the serialization module 215 causes, at least in part, an association of the serialization with respective ones of the one or more data items, the at least one information space 113, or a combination thereof. The serialized computation closures may be stored in the computation spaces 115a-115m.

In one embodiment, the social graph 403, the future states 407, the history 411, the patterns 413, the information flow 417, the information state trajectory 419, the trajectory determination factors 423, or a combination thereof may be stored in the storage 217, in the information spaces 113a-113m, in any other storage having connectivity to the information clustering platform 103 via the communication network 105, on the UEs 107a-107i or a combination thereof.

Figure 4B:
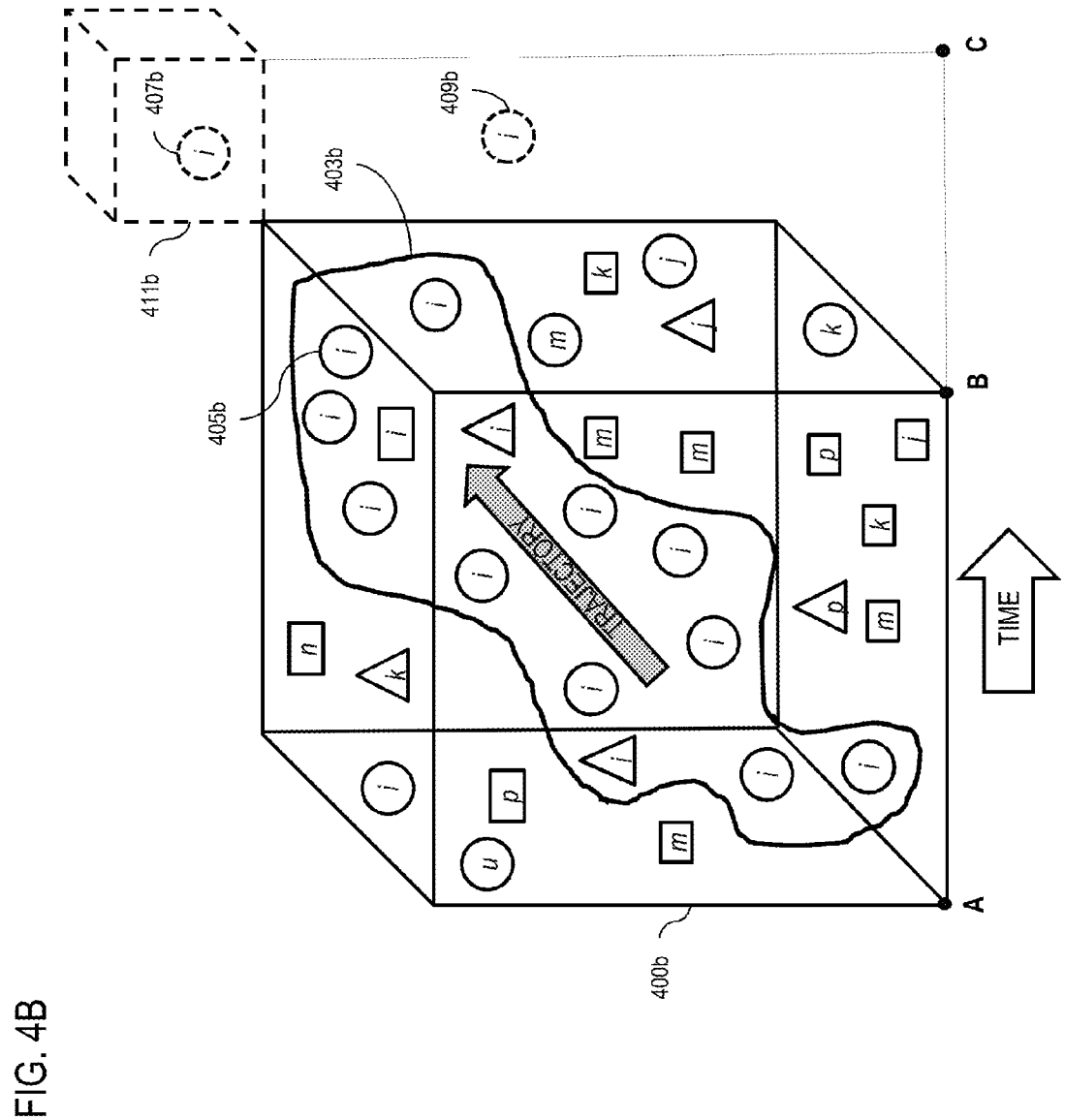
FIG. 4B is a diagram of state trajectory for information management processes, according to one embodiment.

FIG. 4B is a diagram of state trajectory for a sequence of social graph information management processes, according to one embodiment. The information clustering platform 103 may keep, for example in storage 217, a sequence of states for each of a plurality of information management processes, over a period of time from time A to time B. Cube 400b in FIG. 4B represents a three dimensional space consisting of information management processes i, j, k, m, n, p, . . . and their states during a time period from A to B. It is contemplated that the approach described herein is applicable to any multi-dimensional space. In FIG. 4B, active states of processes are shown with circles, inactive states are shown with squares, and transitional states are shown with triangles. A sequence of the consecutive states of a process can be used to describe any evolving behavior of an intelligent information management process in non-monotonic case as an infinite set of inactive (stable), active (unstable) and transition (uncertain) states.

By extending the definitions of the states, the intelligent information management process is represented as a particular model that follows a certain type of state trajectory (or attractor) in a multidimensional state space that is sampled by means of stable and unstable states. An attractor is a set to which a dynamic system evolves after a long enough time. That is, points that get close enough to the attractor remain close even if slightly disturbed. A trajectory of the dynamical system in the attractor does not have to satisfy any special constraints except for remaining on the attractor.

As seen in FIG. 4B, the space within the closed line 403b represents a trajectory of active states (circles) for information management process i between time points A and B. The state trajectory generator 207 of the information clustering platform 103 may predict a finite set 411b of future states (between time point B and time point C) for process i based on the calculated trajectory 403b.

In an exemplary embodiment, assuming that circle 405b represents the last state of process i before time point B, based on state trajectory 403b from possible next states 407b and 409b, state 407b will be the more likely to happen because it is within the range of predicted future states. Therefore, in order to determine recyclability of an information fragment F (not shown), the state trajectory generator 207 checks the recyclability of the information fragment F for all the relevant information management processes until at least one (or a predefined number) of processes are found that may be able to reutilize the information fragment F in the near future. Assuming that process i is a relevant process for the information fragment F and predicted state 407b can benefit from the information fragment F, then the information fragment F can be determined as recyclable for process i. Otherwise, if the information fragment F is determined to be reusable for a state (such as 409b which is too far off from the predicted future states for process i), then the state trajectory generator 207 may identify information fragment F as non-recyclable for process i since the probability of it being reused within time frame B to C is low.

Figure 5:
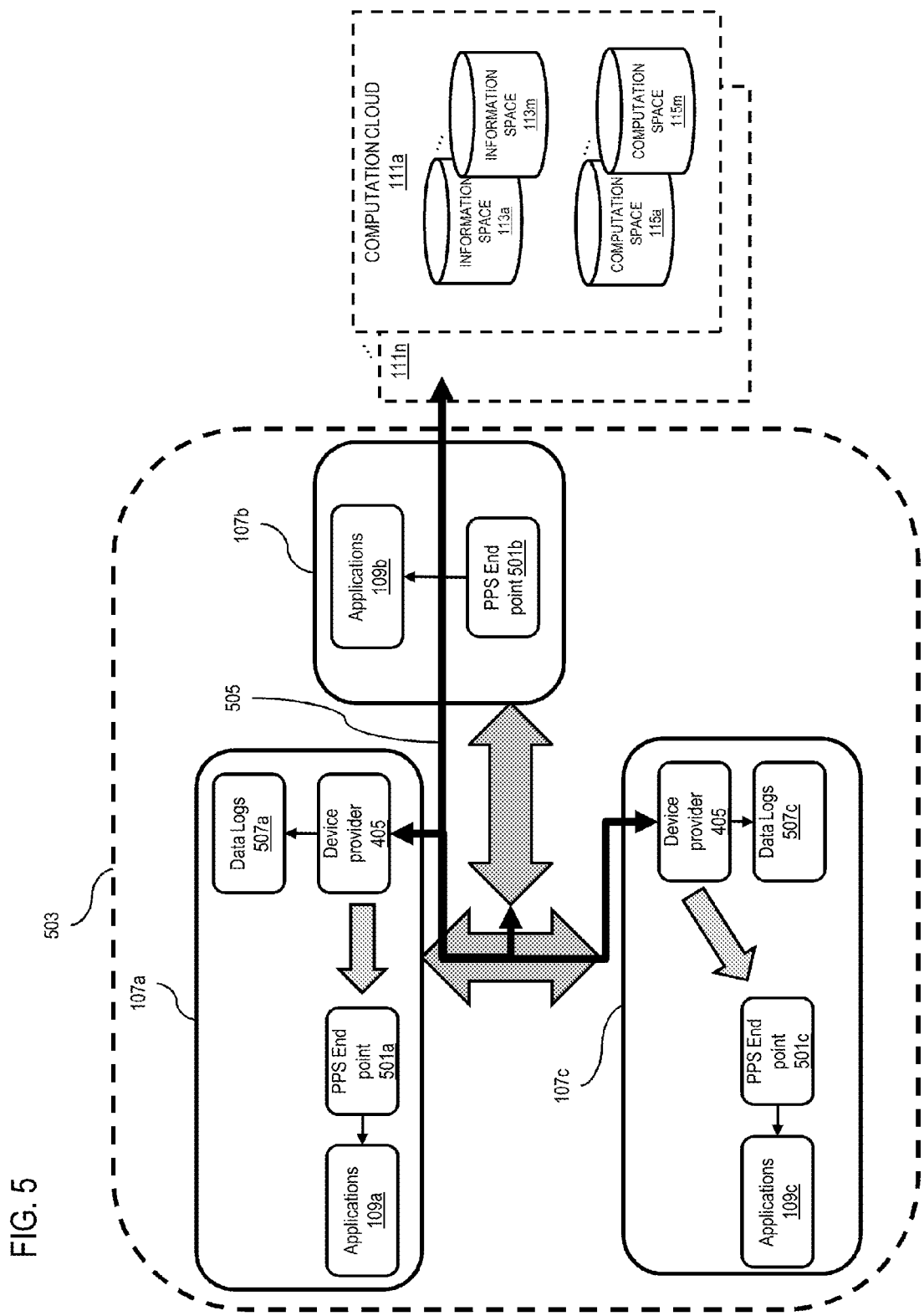
FIG. 5 is a diagram of a personal cloud, according to one embodiment.

FIG. 5 is a diagram of a personal cloud, according to one embodiment. In one embodiment, users own and control all aspects of their own data via interfaces presented on UE 107a-107i, on their own user hosted personal cloud 503 composed on devices 107a-107i associated to the user.

In one embodiment, UEs 107a, 107b, and 107c belong to the same user and in combination provide a personal cloud 503 for the user. A UE 107a or 107c may include data logs 507a and 507c respectively, as part of their storage 507a, and 507c. In this embodiment, UE 107b does not include a data log. Furthermore, a UE 107a-107c may include a collection of applications 109a-109c which may include trusted application such as, for example, a search application that functions in accordance with the information clustering platform 103.

In one embodiment, each user has a personal profile stronghold (PPS) that can be accessed by the UE 107a, 107b, or 107c as a website via a URL, by a Uniform Resource Identifier (URI), or a combination thereof via PPS endpoints 501a, 501b, or 501c. The PPS allows the user to select their trusted applications to be included in applications 109a-109c, configure the trusted applications, visualize data collected by the trusted applications, etc.

In one embodiment, a user may set a default as to how they desire to be seen by third party tracking sites, etc. For example, a user may choose to be anonymous (completely invisible to the entities external to the personal cloud 503), pseudo anonymous (anonymous to any entities outside their current session), or fully disclosed (visible to all entities). An anonymous user will be seen as a different person by other entities with each web hit. However, a pseudo anonymous user will be seen as the same person within a session, but not between different sessions. For example, after closing a browser screen and starting a new session other entities are not able to recognize the user as the same user from previous session.

In one embodiment, the applications 109 may include a personal data collector application to collect data from communications between UEs 107a-107c, between UEs 107a-107c and cloud 111, or a combination thereof.

In one embodiment, each application 109 can access a data log 507, extract relevant information and write the extracted information into a local storage unit, an information space 113a-113m, or a combination thereof. Furthermore, the computations associated with personalization process and creation of personal cloud 503 can be decomposed into their elemental computation closures in computation spaces 115a-115m of clouds 111a-111n.

In one embodiment, the stored information on UEs 107a, 107b, and 107c are synchronized with each other and with computation clouds 111a-111n as shown by arrows 505. The synchronization enables the user to run their processes on clouds 111a-111n whenever resources on UEs 107a-107c are insufficient for the personal cloud 503 to perform the required processes.

Figure 6A:
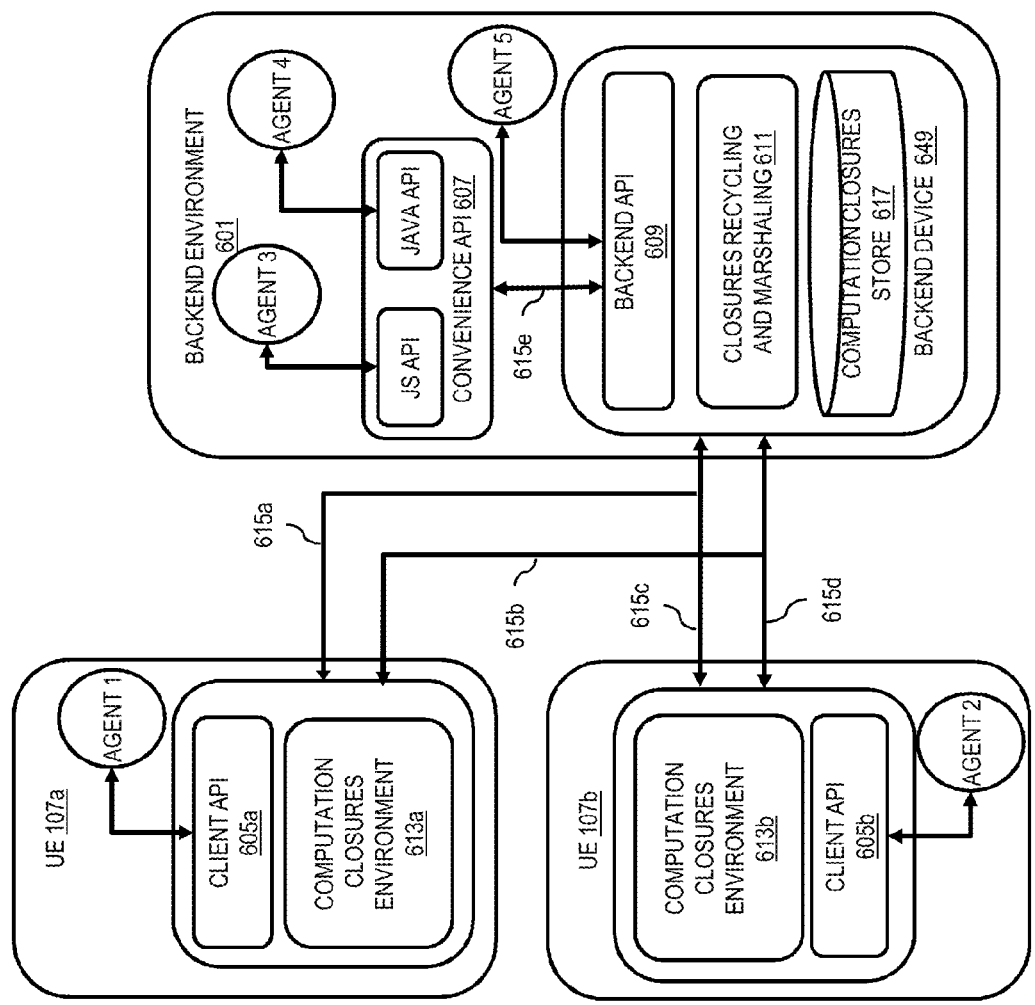
FIGS. 6A-6B are diagrams of computation distribution among devices, according to various embodiments.
Figure 6B:
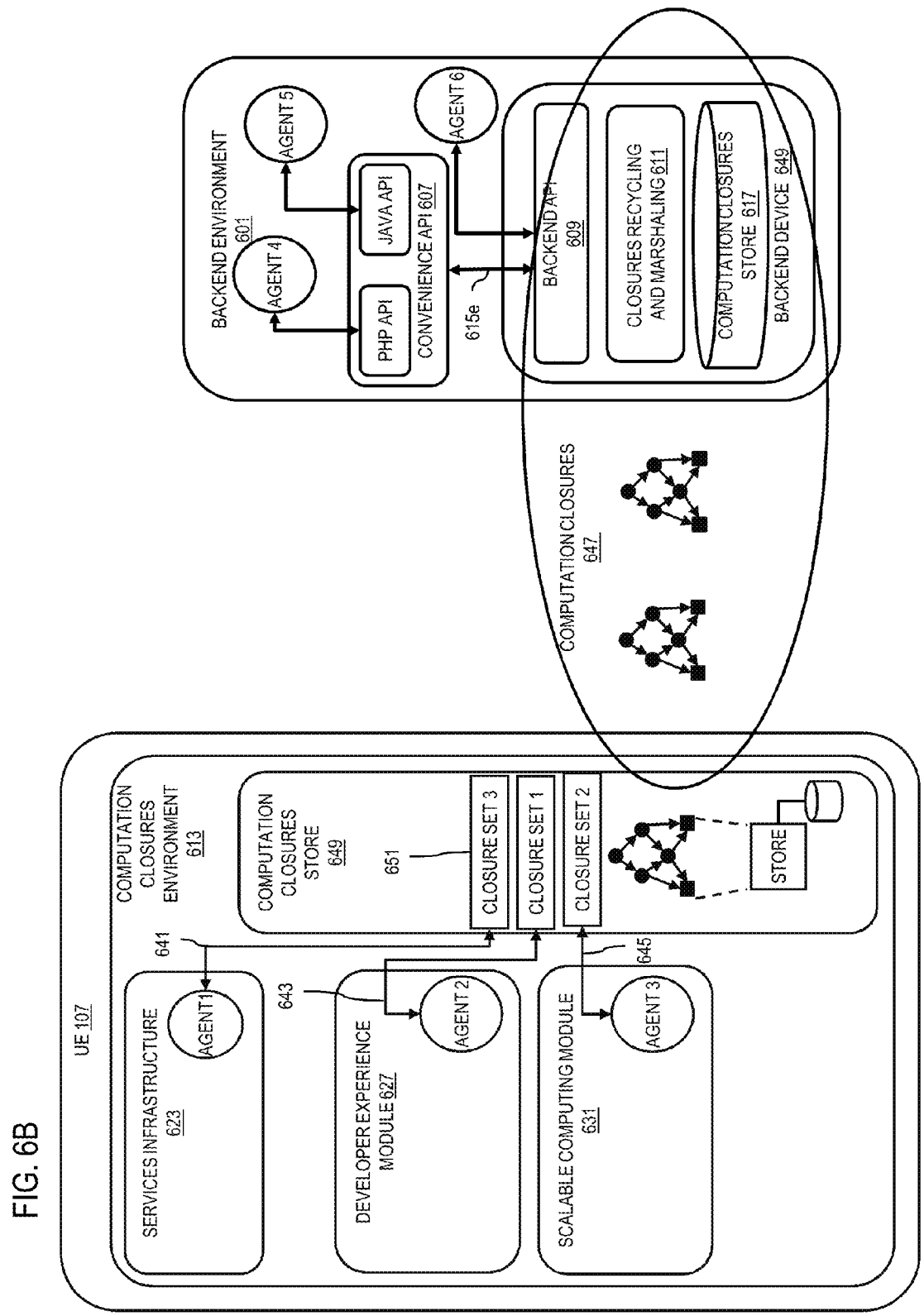

FIGS. 6A-6B are diagrams of computation distribution among devices, according to various embodiments. In one embodiment, in FIG. 6A, the backend environment 601 is a network infrastructure. The backend environment may also be a virtual run-time environment within a cloud 111 associated with the owner of UE 107a or on another UE 107b associated with the user. The backend environment 601 may include one or more components (backend devices) 649 and one or more Application Programming Interface (API) such as a convenience API 607 that may include APIs tailored to the software development environments used (e.g. JAVA, PHP, etc.). Furthermore, UEs 107a and 107b may include client APIs 605a and 605b. Each API enables interaction between devices and components within another device or an environment. For example, backend API 609 enables interaction between the backend device 649 and Agent5, and convenience API 607 enables interaction between the backend device 649 and agents Agent3 and Agent4, wherein each agent is a set of processes that handle computation closures within the backend environment 601. APIs 605a and 605b enable interaction between UE 107a and agent Agent1, and UE 107b and agent Agent2 respectively. As seen in the example of FIG. 6A, Agent3 works under PHP while Agent4 is a JAVA process. Each of the UEs 107a and 107b has a computation closure environment 613a and 613b which may be part of a cloud 111. Arrows 615a-615e represent distribution path of computation closures among the environments 613a, 613b and the computation closures store 617. The computation closures store 617 is a repository of computation closures that can be accessed and used by all the UEs and infrastructure components having connectivity to the backend environment 601.

In one embodiment, the backend device 649 may be equipped with a closure recycling and marshaling component 611 that monitors and manages any access to the computation closures store 617. In other embodiments the closure recycling and marshaling (i.e. standardization for uniform use) may be a function of the information clustering platform 103.

In one embodiment, the computation closures within environments 613a, 613b and the computation closures store 617 may be composed based on anonymous function objects and automatically created by a compiling system using methods for generating anonymous function objects such as lambda expressions.

FIG. 6B is an expanded view of a computation closure environment 613 as introduced in FIG. 6A. The computation closure environment 613 may be composed of one or more computation closure generating components. In one embodiment the computation closure environment 613 has a services infrastructure 623 that provides various services for the user of the UE 107. The services may include any application that can be performed on the UE 107 such as, games, music, text messaging, voice calls, etc. In one embodiment, the services infrastructure 623 provides support for closure distribution under the supervision of an information clustering platform 103 as discussed in FIG. 1, FIG. 2, and FIG. 3. The agent Agent1 retrieves the computation closures required by the services infrastructure 623 from the computation closures store 649 and stores the newly generated computation closures by the services infrastructure 623 into the computation closures store 649 for distribution purposes per arrow 641.

In another embodiment, the computation closure environment 613 has a developer experience module 627 that provides various tools for a developer for manipulating services offered by the UE 107. The tools may include standardized and/or abstract data types and services allowing the developers to chain processes together across development platforms. In one embodiment, the developer experience module 627 provides cross platform support for abstract data types and services under the supervision of an information clustering platform 103 as discussed in FIG. 1. The agent Agent2 retrieves the computation closures required by the developer experience module 627 from the computation closures store 649 and stores the newly generated computation closures by the developer experience module 627 into the computation closures store 649 for distribution purposes per arrow 643.

In yet another embodiment, the computation closure environment 613 has a scalable computing module 631 that provides an abstract wrapper (i.e. monadic wrapper) for the transmitting closures 651. This abstraction provides computation compatibility between the closure sets 651 and the UE 107. The abstract wrapper may provide scheduling, memory management, system calls and other services for various processes associated with the closures 651. These services are provided under the supervision of the information clustering platform 103 as discussed in FIG. 1. The agent Agent3 retrieves the computation closures required by the scalable computing module 631 from the computation closures store 649 and stores the newly generated computation closures by the scalable computing module 631 into the computation closures store 649 for distribution purposes per arrow 645. In one embodiment, the backend environment 601 may access the computation closures store 649 and exchange/transmit one or more computer closures 647 between the computation closures store 649 and the backend computation closures store 617.

Figure 7A:
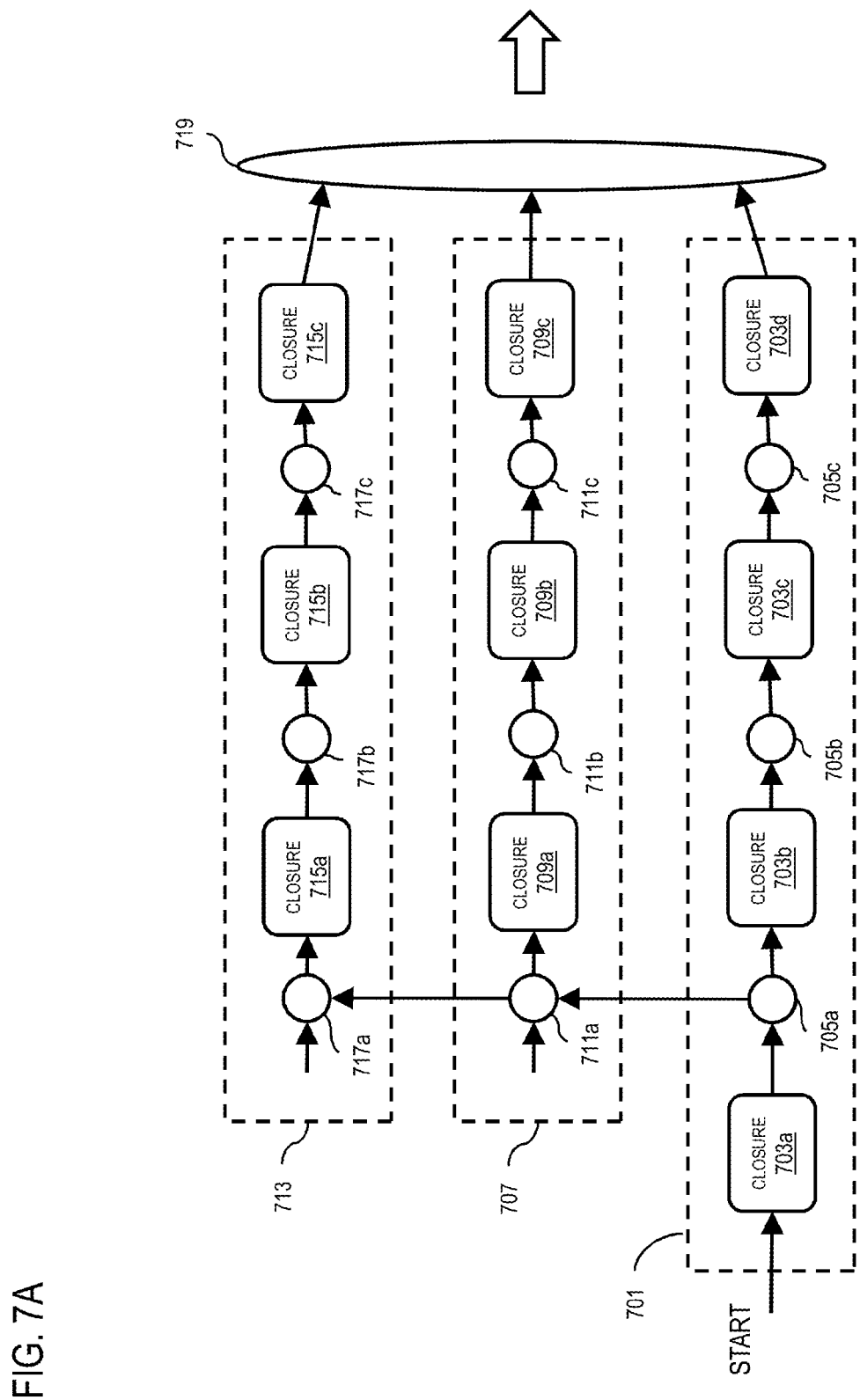
FIGS. 7A-7B are diagrams of computation distribution and load balancing in multi-level computation closure architecture, according to one embodiment.
Figure 7B:
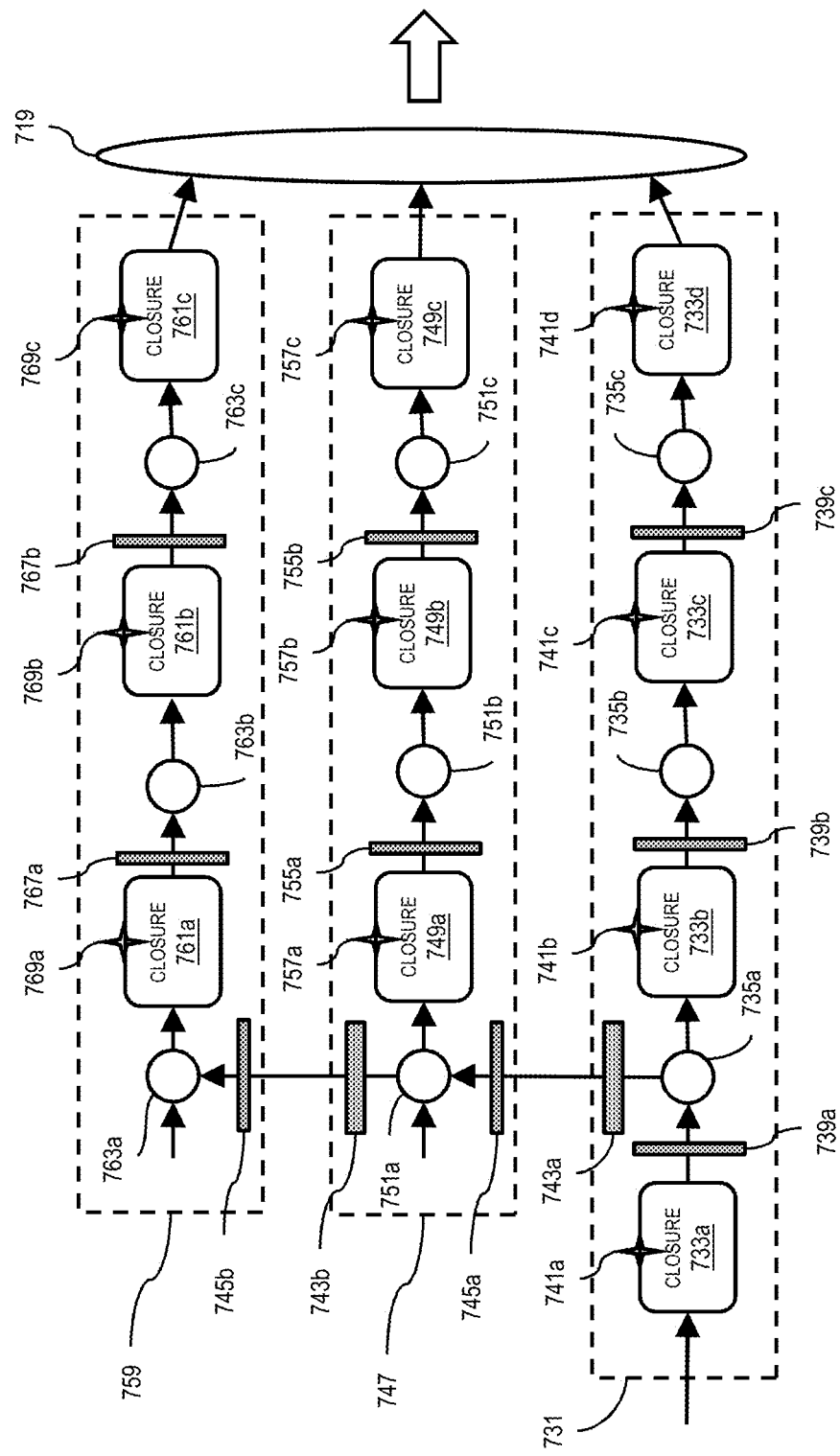

FIGS. 7A-7B are diagrams of computation distribution and load balancing in multi-level computation closure architecture, according to one embodiment. FIG. 7A is a general representation of computation distribution. As seen in FIG. 7A, the computation distribution starts at a component 701 of an architectural level (not shown). Each component may execute a set of closures that constitute a computation branch. For example, the branch 701 is composed of closures 703a-703d, wherein every two consecutive closures are connected via a connector and computational branches are communicating via connectors as well. For example, connectors 705a-705c connect closures 703a-703d. Connectors may also transfer information and data associated with a closure and its execution results to the next closure in the branch or to other branches. Additionally, connectors may function as links between related branches that constitute a distributed computation.

In one embodiment, connectors may contain information about parameters such as capabilities, functional flows, distribution maps, links between closures and architectural levels, etc. Arrows connecting closures to connectors and connectors to next closures show the functional flow adopted based on the parameters. As seen in FIG. 7A, the closures have been distributed from component 701 to component 707 via communication between connector 705a and connector 711a. The computation branch of component 707 includes closures 709a-709c communicating via connectors 711b and 711c, while branches 701 and 707 communicate via connectors 705a and 711a. Similarly, a third branch 713 has been formed of closures 715a-715c being executed at component 713 and connected by connectors 717b and 717c, while the branch communicates with other branches via connector 717a. The final results from closure execution of the three branches 701, 707, and 713 are aggregated (719) by the search nodes 117, by applications 109a-109i, or a combination thereof, and forwarded to the requesting device.

In one embodiment, the initial branch 701 may be in a UE 107a-107i, the second branch 707 in a component of the infrastructure 117a-117n, and the third branch in another component of the same infrastructure, a different infrastructure, in a cloud, or a combination thereof.

FIG. 7B shows a computation distribution together with various parameters affecting the distribution. As seen in FIG. 7B, the computation distribution starts at a component 731 of an architectural level (not shown). Each component may execute a set of closures that constitute a computation branch. For example, the branch 731 is composed of closures 741a-741d, wherein every two consecutive closures are connected via a connector and computational branches are communicating via connectors as well. For example, connectors 735a-735c connect closures 733a-733d. Connectors may also transfer information and data associated with a closure and its execution results to the next closure in the branch or to other branches. Additionally, connectors may function as links between related branches that constitute a distributed computation.

In one embodiment, connectors may contain information about parameters such as capabilities, functional flow specifications, distribution maps, links between closures and architectural levels, etc. Arrows connecting closures to connectors and connectors to next closures show the functional flow adopted based on the parameters. For example, star signs 741a-741d, 757a-757c, and 769a-769c may represent capability parameters associated with each closure 733a-733d, 749a-749c, and 761a-761c respectively. Additionally, blocks 739a-739c, 755a-755b, 767a-767b, and 743a-743b may represent cost values. For example, the cost value 739a may show the cost for binding closure 733b to closure 733a and directs closure 733b to branch 731, via connector 735a, as the next closure to be executed after closure 733a. The closures may be initially assigned with priority levels, so that less important closures can be omitted if necessary. Similarly, cost values 739b and 739c direct closures 733c and 733d in branch 731 via connectors 737b and 737c. In a higher level of hierarchy, the cost value 745a directs closures 749a-749c to component 747 and similarly the cost value 745b directs closures 761a-761c to component 759. Additionally in branch 747, connectors 751a-751c and cost values 755a and 755b direct closures 749a-749c down the path of branch 747. Similarly, in branch 759, connectors 763a-763c and cost values 767a and 767b direct closures 761a-761c down the path of branch 759. The final results from closure execution of the three branches 731, 747, and 759 are aggregated (shown by arrow 719) and forwarded to the requesting device.

The processes described herein for providing information clustering based on predictive social graphs may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
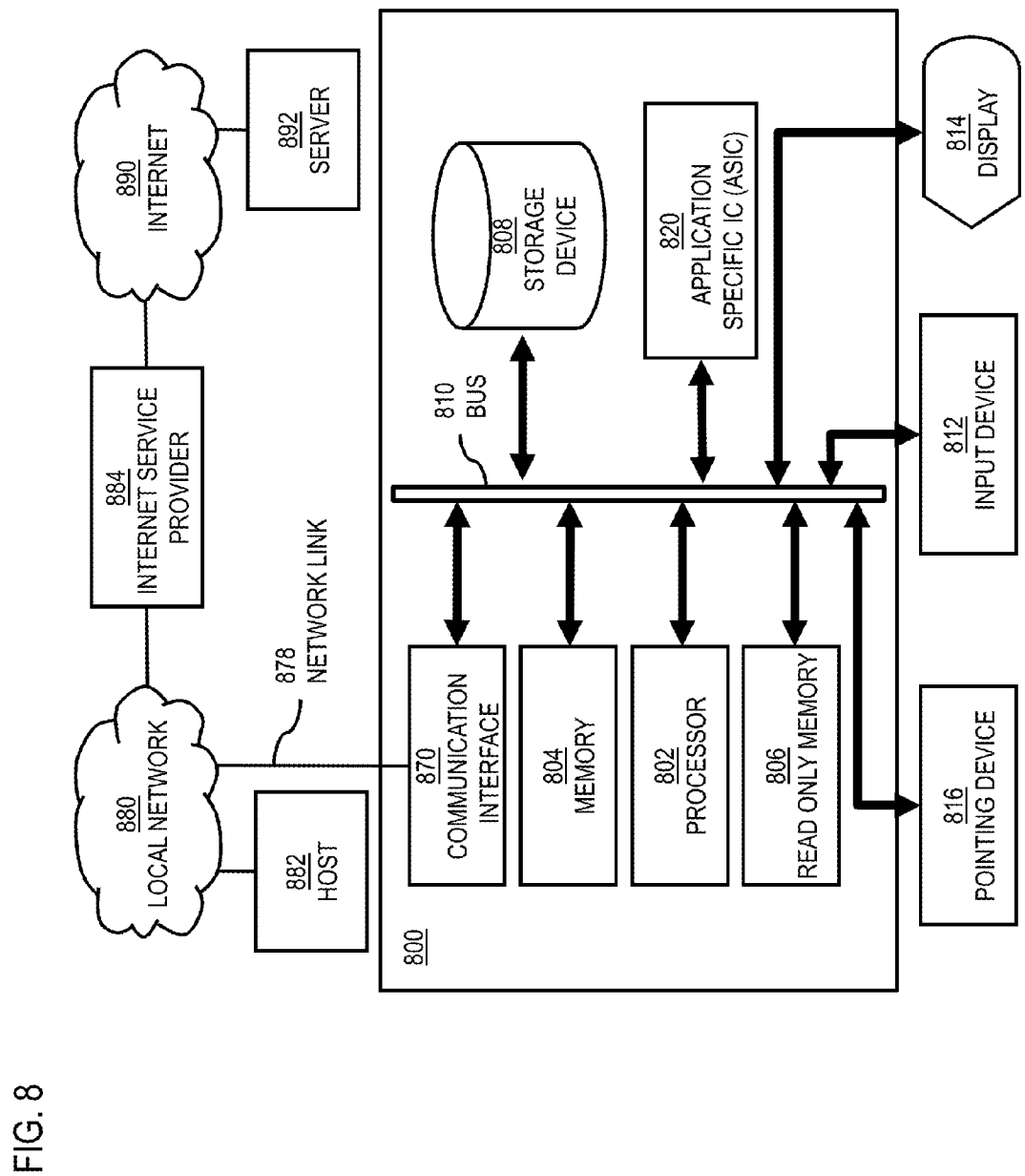
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide information clustering based on predictive social graphs as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing information clustering based on predictive social graphs.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing information clustering based on predictive social graphs. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing information clustering based on predictive social graphs. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing information clustering based on predictive social graphs, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing information clustering based on predictive social graphs to the UEs 107a-107i.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide information clustering based on predictive social graphs as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing information clustering based on predictive social graphs.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide information clustering based on predictive social graphs. The memory 905 also stores the data associated with or generated by the execution of the inventive steps.

Figure 10:
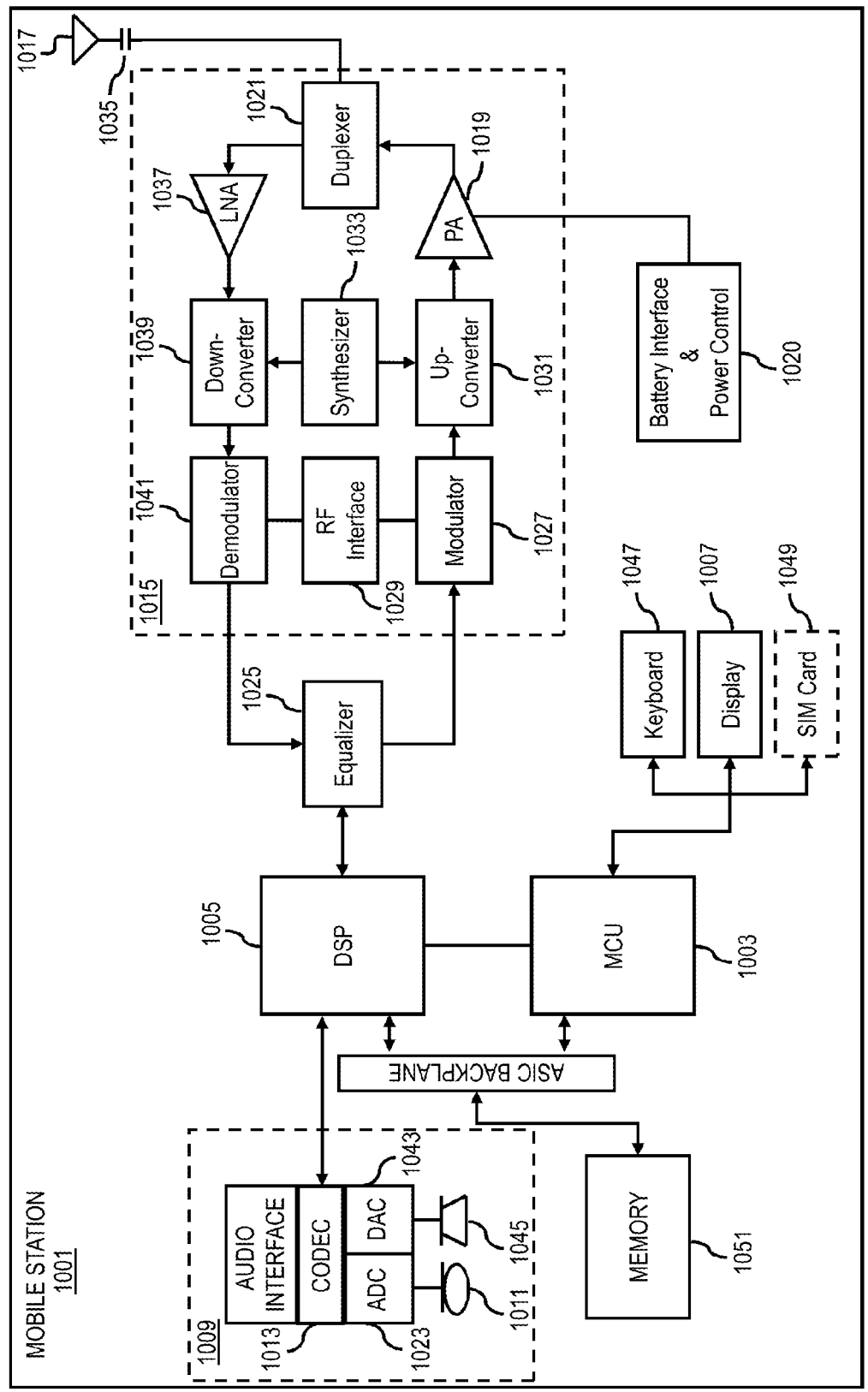
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing information clustering based on predictive social graphs. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing information clustering based on predictive social graphs. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide information clustering based on predictive social graphs. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signal detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    processing one or more social graphs associated with one or more users to cause a prediction of one or more future states of the one or more social graphs, wherein processing the one or more social graphs comprises,
    determining respective information trajectories defining a finite set of possible, nearest future states of the respective one or more social graphs,
    extracting historical patterns based on the one or more social graphs, and
    selecting the one or more future states from the set of possible future states based at least in part on the most recent historical patterns; and
    clustering one or more data items distributed over a plurality of storage partitions in a cloud, associated with at least one information space and at least one computation space, based, at least in part, on the one or more social graphs, the one or more future states, or a combination thereof, wherein the at least one information space comprises data associated with a user of a social network and the at least one computation space comprises computation closures associated with computation resources of the cloud, based, at least in part, on processing and maintaining the one or more social graphs, wherein computation closures identify a respective computation procedure together with relations and communications among one or more processes including one or more of passing arguments, sharing process results, selecting results provided from computation of alternative inputs or flow of data.

2. A method of claim 1 further comprising:
    processing one or more attributes associated with the one or more users to determine the one or more social graphs, the one or more future states, the one or more data items, or a combination thereof.

3. A method of claim 1 further comprising:
    determining at least one sequence of one or more information management processes associated with the one or more data items;
    processing the at least one sequence to determine one or more process states of the respective one or more information management processes;
    determining one or more information state trajectories based, at least in part, on at least one sequence, the one or more process states, or a combination thereof; and
    causing, the prediction of the one or more future states based, at least in part, on the one or more information state trajectories.

4. A method of claim 3 further comprising:
    processing the one or more information state trajectories, the one or more future states, or a combination thereof to determine recyclability information associated with the one or more data items,
    wherein the clustering of the one or more data items is based, at least in part, on the recyclability information.

5. A method of claim 3 further comprising:
    determining at least one model state space based, at least in part, on the one or more state trajectories, the one or more process states, or a combination thereof; and
    causing the prediction of the one or more future states based, at least in part, on an observation of the at least one model state space.

6. A method of claim 3, wherein the one or more process states include, at least in part, one or more active states, one or more inactive states, one or more transitional states, or a combination thereof, and the one or more information state trajectories include, at least in part, one or more regular motions, one or more stochastic motions, or a combination thereof with respect to the one or more process states.

7. A method of claim 1 further comprising:
    determining a history of utilization of the one or more data items, the at least one information space, or a combination thereof;
    processing the history to cause, at least in part, an extraction of one or more patterns; and
    determining the one or more finite sets, the one or more possible future states, the one or more future states, or combination thereof based, at least in part, on the one or more patterns.

8. A method of claim 1 further comprising:
    determining one or more information state trajectories based, at least in part, on an inference action, a conceptual clustering, an analogy creation, one or more working conditions, a fault prediction, one or more usage patterns, a workload estimation, or a combination, wherein the one or more data items are retrieved from the plurality of the partitions within a plurality of distributed storages based, at least in part, on the one or more social graphs, the one or more future states, or a combination thereof.

9. A method of claim 1, further comprising:
    serializing one or more computation closures associated with the processing of the one or more social graphs, the prediction of the one or more future states, the clustering of the one or more data items, or a combination thereof; and
    associating the serialization with respective ones of the one or more data items, the at least one information space, or a combination thereof.

10. An apparatus comprising:
    at least one processor; and
    at least one memory including computer program code for one or more programs, the at least one memory and the computer program code configured to, with the at least one processor, cause the apparatus to perform at least the following,
    process one or more social graphs associated with one or more users to cause a prediction of one or more future states of the one or more social graphs, wherein processing the one or more social graphs comprises,
    determining respective information trajectories defining a finite set of possible, nearest future states of the respective one or more social graphs,
    extracting historical patterns based on the one or more social graphs, and
    selecting the one or more future states from the set of possible future states based at least in part on the most recent historical patterns; and
    cause a clustering of one or more data items distributed over a plurality of storage partitions in a cloud, associated with at least one information space and at least one computation space, based, at least in part, on the one or more social graphs, the one or more future states, or a combination thereof, wherein the at least one information space comprises data associated with a user of a social network and the at least one computation space comprises computation closures associated with computation resources of the cloud, based, at least in part, on processing and maintaining the one or more social graphs, wherein computation closures identify a respective computation procedure together with relations and communications among one or more processes including one or more of passing arguments, sharing process results, selecting results provided from computation of alternative inputs or flow of data.

11. An apparatus of claim 10, wherein the apparatus is further caused to:
process one or more attributes associated with the one or more users to determine the one or more social graphs, the one or more future states, the one or more data items, or a combination thereof.

12. An apparatus of claim 10, wherein the apparatus is further caused to:
determine at least one sequence of one or more information management processes associated with the one or more data items;
process the at least one sequence to determine one or more process states of the respective one or more information management processes;
determine one or more information state trajectories based, at least in part, on at least one sequence, the one or more process states, or a combination thereof; and
cause the prediction of the one or more future states based, at least in part, on the one or more information state trajectories.

13. An apparatus of claim 12, wherein the apparatus is further caused to:
process the one or more information state trajectories, the one or more future states, or a combination thereof to determine recyclability information associated with the one or more data items,
wherein the clustering of the one or more data items is based, at least in part, on the recyclability information.

14. An apparatus of claim 12, wherein the apparatus is further caused to:
determine at least one model state space based, at least in part, on the one or more state trajectories, the one or more process states, or a combination thereof; and
cause the prediction of the one or more future states based, at least in part, on an observation of the at least one model state space.

15. An apparatus of claim 12, wherein the one or more process states include, at least in part, one or more active states, one or more inactive states, one or more transitional states, or a combination thereof, and the one or more information state trajectories include, at least in part, one or more regular motions, one or more stochastic motions, or a combination thereof with respect to the one or more process states.

16. An apparatus of claim 10, wherein the apparatus is further caused to:
determine a history of utilization of the one or more data items, the at least one information space, or a combination thereof;
process the history to cause, at least in part, an extraction of one or more patterns; and
determine the one or more finite sets, the one or more possible future states, the one or more future states, or combination thereof based, at least in part, on the one or more patterns.

17. An apparatus of claim 10, wherein the apparatus is further caused to:
determine one or more information state trajectories based, at least in part, on an inference action, a conceptual clustering, an analogy creation, one or more working conditions, a fault prediction, one or more usage patterns, a workload estimation, or a combination,
wherein the one or more data items are retrieved from the plurality of the partitions within a plurality of distributed storages based, at least in part, on the one or more social graphs, the one or more future states, or a combination thereof.

18. An apparatus of claim 10, wherein the apparatus is further caused to:
cause, at least in part, a serialization of one or more computation closures associated with the processing of the one or more social graphs, the prediction of the one or more future states, the clustering of the one or more data items, or a combination thereof; and
cause, at least in part, an association of the serialization with respective ones of the one or more data items, the at least one information space, or a combination thereof.

19. A method of claim 1, wherein the at least one computation space is further based, at least in part, on computations associated with a personalization process and creation of a personal cloud.

20. An apparatus of claim 10, wherein the at least one computation space is further based, at least in part, on computations associated with a personalization process and creation of a personal cloud.

* * * * *